INVENTOR.
MARVIN REICH
BY J. Hodges
Marvin Reich
ATTYS.

INVENTOR.
MARVIN REICH
BY
ATTYS.

INVENTOR.
MARVIN REICH
BY
ATTYS.

INVENTOR.
MARVIN REICH
BY [signature]
ATTYS.

INVENTOR.
MARVIN REICH
BY [signature]
ATTYS.

United States Patent Office 3,327,301

Patented June 20, 1967

3,327,301

MULTIVIBRATORS FOR CONVERSION OF ANALOG VOLTAGES TO A CODED GROUP OF PULSES

Marvin Reich, Montgomery County, Md.
(1174 College View Drive, Silver Spring, Md. 20902)

Filed Jan. 20, 1964, Ser. No. 339,036
30 Claims. (Cl. 340—347)

The invention described herein may be manufactured and used by or for the Government of the United States of America for governmental purposes without the payment of any royalties thereon or therefor.

The invention is generally directed to an apparatus for control of pulse generating systems in response to a variable direct current voltage signal and more particularly, to an apparatus for the conversion of a variable direct current voltage signal to a series of pulses which are indicative of the value of said variable direct current voltage signal.

For example, the desirability of converting an analog voltage signal bearing information in the form of amplitude into a coded group of pulses, the code of the latter corresponding to the amplitude of the former has been established. Very briefly, the conversion of analog voltages to coded groups of pulses are of great value in modern data processing systems, in communication systems and in various control circuits for automated machinery. Analog to digital converters, pulse encoders and various types of multivibrators have been used in the prior art. However, the prior art analog to digital converters and pulse encoders generally comprise very complex circuits and in addition, lack flexibility. Similarly, the prior art contains multivibrators which are either bistable, astable or monostable with two different time periods. However, these prior art multivibrators are not capable of being both bistable and monostable for variably controlled time periods with either side of the monostable multivibrator being in a normally conductive condition.

An object of the invention is the improvement of systems for converting analog voltages bearing information in the form of amplitude into coded group of pulses, the code of the latter corresponding to the amplitude of the former.

A further object of the invention is to provide an analog to digital converter which is compatible with digital data processing systems.

Another object of the invention is to provide an analog to digital converter having high reliability and simplicity of design.

Still another object of the invention is to provide a bistable or astable multivibrator to serve as a pulse encoder.

Still a further object of the invention is to provide a multivibrator capable of being either bistable or monostable for variably controlled time periods with either side of the multivibrator being in a predominately conductive condition.

In accordance with the preferred form of the invention, information in the form of direct current voltages of variable amplitude is obtained from the physical phenomenon measuring instrument whose output is to be converted to a digital code for processing by a digital computer. The analog voltage signal is fed to an analog to frequency converter the output of which is fed to a gate. The gate is supplied with a gating signal which is the clock pulse from the digital computer wherein the analog information will be utilized. The output of the gate is fed into a counter which may be either a tens counter or a binary counter as desired. However, the counter should be compatible with the digital computer which is to be fed. In the event the speed of operation of the computer is greater than that of the analog to frequency converter or, alternatively, if it is desired to store the information for a period of time until the computer can accept the converted coded information, then a counter with a read out control is provided. Instructions for the read out control will be derived from the digital computer.

In an alternative embodiment the output of an analog to frequency converter can be supplied to a first input of a modulator having a pair of inputs with the other input of the modulator comprising a communication channel containing information which is to be transmitted in a predetermined coded fashion. In this alternative embodiment the input of the analog converter will be a predetermined voltage code which may be recorded in a form of a self repeating loop of magnetic tape. The coded signal can only be decoded by a receiver of the encoded information having a demodulator and a similar analog to frequency converter with a copy of the self repeating loop of magnetic tape containing the analog voltage code. It is to be understood by those skilled in the art that the analog voltage code is to contain a keying code and may be stored on other repetitive analog storage devices than loops of magnetic tape.

In accordance with the preferred form of the invention, multivibrators are provided with fieldistors as control elements for controlling the state of conduction of the multivibrator and for simultaneously controlling the duration of the conduction. Generally in a case where it is desired to convert analog voltage signals to digital pulses, one would connect the source of analog voltage to the input of the fieldistors. However, if it is desired to utilize the invention as a pulse encoder to feed a predetermined modulation or demodulation system then the analog voltage source is a predetermined voltage recorded on a loop of self repeating magnetic tape or on an equivalent repetition storage device. Furthermore, in accordance with the invention, fieldistors in response to an analog input will convert a bistable multivibrator to a monostable multivibrator having variable durations of monostability with either side of the monostable multivibrator being in the normally conductive condition.

Other objects and many of the intended advantages of this invention will be readily appreciated as the same becomes better understood by reference to the following detailed description when considered in connection with the accompanying drawings wherein.

Figure 1:
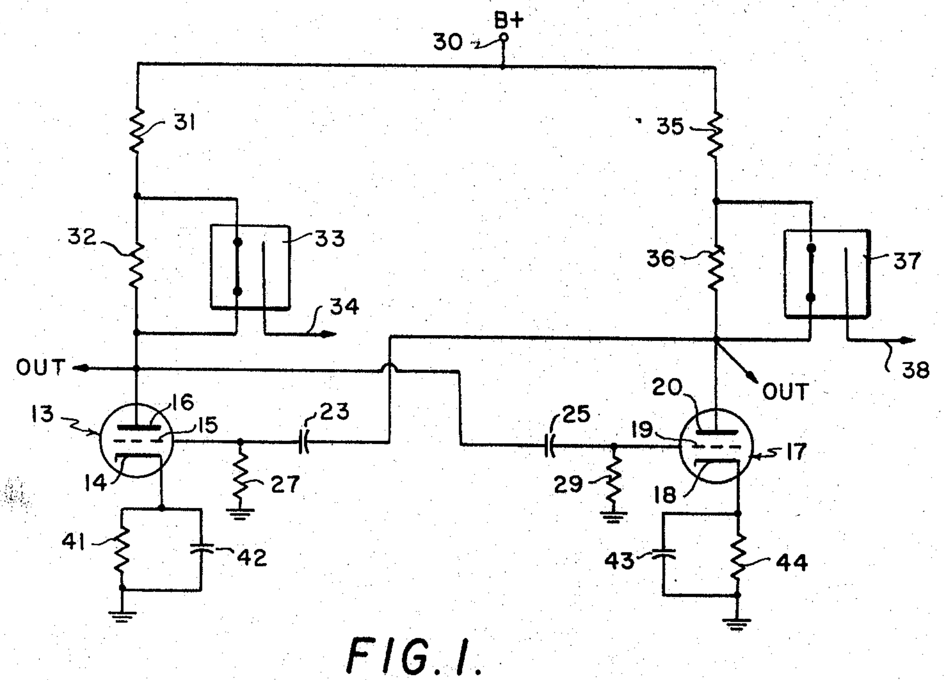
FIG. 1 is a circuit diagram of an astable multivibrator forming an analog converter in accordance with the present invention.

Referring to FIG. 1, an exemplary embodiment of an analog to frequency converter according to the invention comprises a multivibrator utilizing a first tube 13 having a cathode 14, a control grid 15 and a plate 16 and a second tube 17 having a cathode 18, a control grid 19 and plate 20. The plate 16 of tube 13 is cross coupled by capacitor 25 to the grid 19 of tube 17. The plate 20 of tube 17 is cross coupled by capacitor 23 to the grid 15 of tube 13. A bias resistor 27 is connected between ground and the grid 15 of tube 13. Similarly, a bias resistor 29 is connected between ground and control grid 19 of tube 17. A source of B plus voltage 30 is connected through a first resistor 31 and a second resistor 32 in series with plate 16 of tube 13. A fieldistor 33 having an input lead 34 is connected in parallel across resistor 32. Similarly, the source of B plus voltage 30 is connected through resistor 35 and resistor 36 in series to the plate 20 of tube 17. A second fieldistor 37 having an input lead 38 is placed in parallel across resistor 36. Input lead 34 of fieldistor 33 and input lead 38 of fieldistor 37 are connected to a source of analog voltage which is to control the impedance of fieldistors 33 and 37. Suitable fieldistors can be found in the prior art; examples, thereof are shown in the patent to J. P. Wallmark, 2,900,531, issued Aug. 18, 1959, a patent to R. Forman, 2,935,624, issued May 3, 1960, also British Patent 439,457, issued in 1936. However, other fieldistors, field effect transistors and voltage devices are utilizable with the present invention. A resistor 41 is connected between cathode 14 of tube 13 and ground. The capacitor 42 is connected in parallel across resistor 41. The capacitor 43 is connected between the cathode 18 of tube 17 and ground. A resistor 44 is connected in parallel across capacitor 43.

The illustrated example of the invention of FIG. 1 operates as follows: making the following assumptions that fieldistors 33 and 37 are made of N type conductive material, and that a positive voltage placed on their respective inputs would reduce their resistance making the semi-conductor material more conductive. Conversely, a negative input on terminals 34 and 38 of fieldistors 33 and 37 respectively would make the resistivity of fieldistors 33 and 37 increase. It is to be understood that if the material of fieldistors 33 and 37 is P type, then a negative voltage placed on the input terminals 34 and 38 would reduce the resistivity of fieldistors 33 and 37, conversely, a positive potential on the input of fieldistors 33 and 37 will increase their resistivity. Assuming now that the input on terminals 34 and 38 is such that the resistance of elements 33 and 37 is a maximum the multivibrator tubes 13 and 17 will be astable at a first given frequency which will be the lowest frequency of response of the astable multivibrator. The astable multivibrator disclosed in FIG. 1 operates as an oscillator and a suitable description of the operation can be found in the book "Basic Theory and Application of Transistors," published by headquarters, Department of the Army, March 1959, T.M. 11–690, pages 181, 182 and 183. As the absolute magnitude of the analog voltage increases on the input terminals of 34 and 38, the resistivity of the fieldistors 33 and 37 decreases. Decreasing the resistivity of the fieldistors 33 and 37 decreases the resistance of the parallel combination they are respectively part of, causing the capacitors 23 and 25 to charge at a much faster rate from the B plus supply 30. Therefore, as the analog voltage increases on the inputs 34 and 38 of fieldistors 33 and 37 the output of tubes 13 and 17 will be of a higher frequency. The absolute value of every analog voltage input can be equated to a particular frequency of the astable multivibrator and simply stated an increasing analog voltage signal causes the frequency of the astable multivibrator to increase. The utilization of a device of this type will become further apparent as the disclosure progresses.

Figure 2:
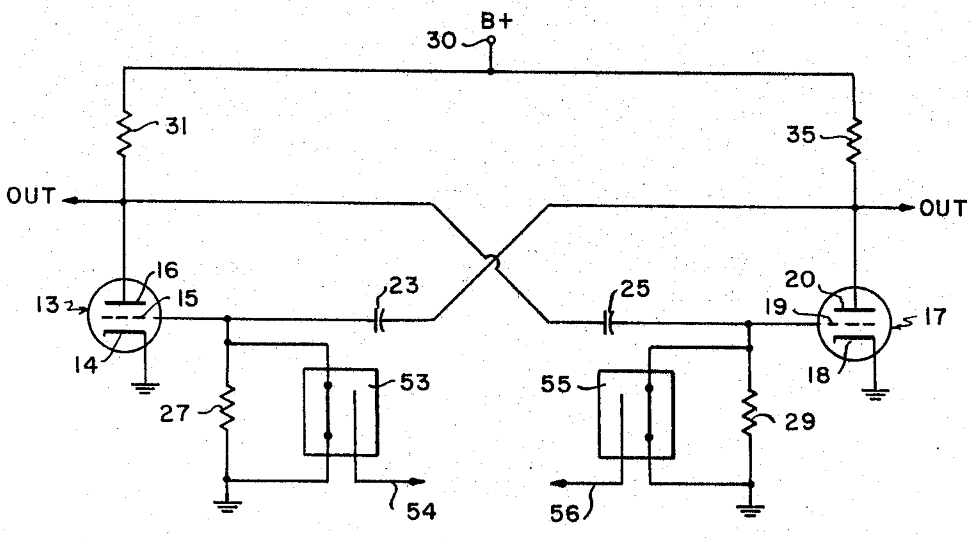
FIG. 2 is a circuit diagram of another astable multivibrator forming an alternative embodiment of an analog converter in accordance with the present invention.

Similar elements in FIG. 2 carrying the same numerical numbers as the components of FIG. 1 operate in an identical fashion. Fieldistor 53 having an input terminal 54 is placed across resistor 27 in parallel and fieldistor 55 having an input terminal 56 is connected in parallel across resistor 29. FIG. 2 operates in a similar manner as FIG. 1 with the following exception, as the analog voltage increases on inputs 54 and 56 of fieldistors 53 and 55 the resistance of the parallel combination of resistor 27 and fieldistor 53 decreases and the resistance of the parallel combination of resistor 29 and fieldistor 55 decreases thereby discharging capacitors 23 and 25 at a more rapid pace, thusly increasing the frequency of the astable multivibrator of the circuit of FIG. 2. Therefore, every analog voltage which is placed on elements 54 and 56 has a corresponding distinct frequency output for the multivibrator. It is to be noted that a first resistor can be placed in parallel with capacitor 23 and a second resistor placed in parallel with capacitor 25 for the purpose of speeding up the operation of the astable multivibrator.

Figure 3:
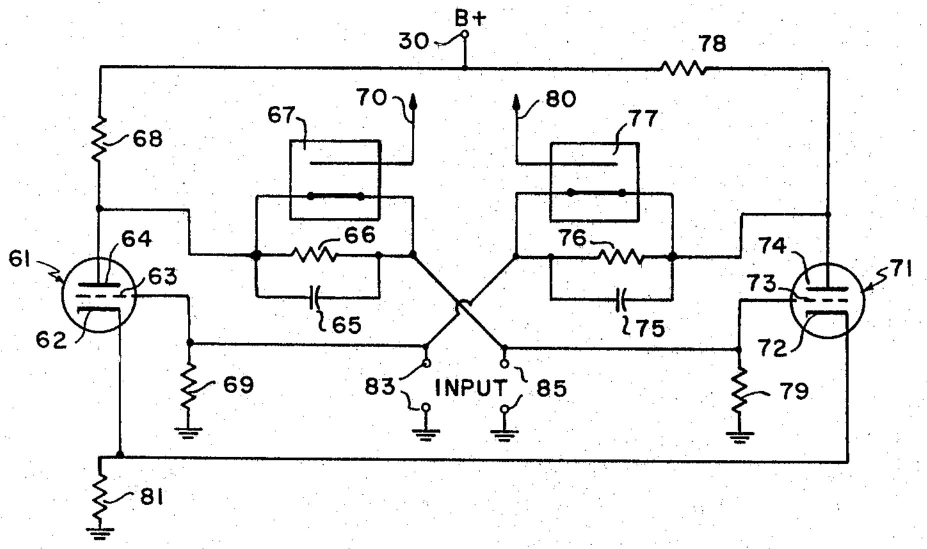
FIG. 3 is a circuit diagram of multivibrator which is a bistable multivibrator convertible to a monostable multivibrator in accordance with the present invention.

FIG. 3 discloses an embodiment of the invention comprising a bistable multivibrator capable of being a monostable multivibrator for variable time duration with either side of the multivibrator in the predominately stable state. Accordingly, a first tube 61 having a cathode 62, a control grid 63 and a plate 64 is cross coupled to a second tube 71 having a cathode 72, a control grid 73 and a plate 74. The cross coupling network comprises a capacitor 65 in parallel with a resistor 66 and a fieldistor 67 is coupled between the plate 64 of tube 61 and the control grid 73 of tube 71. A resistor 68 is coupled between the plate 64 of tube 61 to the source of B plus supply 30. The control grid 63 of tube 61 is coupled to ground through a resistor 69. A common cathode resistor 81 has one end connected to the cathode 62 of tube 61 and the other end connected to ground. The second parallel coupling network comprises a capacitor 75 in parallel with a resistor 76 and fieldistor 77 is coupled between the plate 74 of tube 71 and the control grid 63 of tube 61. A resistor 78 is connected from the source of B plus supply 30 to the plate 74 of tube 71. A resistor 79 is connected between ground and the control grid 74 of tube 71. The cathode 72 of the tube 71 is connected to the common cathode resistor 81.

FIG. 3 is normally a bistable multivibrator when no voltage source is applied to input 70 of fieldistor 67 and to input 80 of fieldistor 77. Either tube 61 or alternatively tube 71 can be in a stable state of conduction and whichever tube is conducting when the next pair of pulses are applied to terminals 83 and 85 the state of conduction is switched to the other side as is common in bistable multivibrators. However, assuming now that a potential is placed on the input 70 of fieldistor 67 such as to place fieldistor 67 in its lowest resistivity region, then the tube 71 will be in the on condition with tube 61 in the off condition and a negative pulse placed on the input terminal 85 connected to the grid 73 of tube 71 or a positive pulse placed on input terminal 83 connected to the grid 63 of tube 61, then the tube 71 becomes cut off and tube 61 becomes conductive. The circuit remains in its monostable state for a period long enough for condenser 75 to discharge to ground through tube 71. Upon cessation of the discharging action of capacitor 75 the regenerative action ceases and tube 61 begins to become less conductive and tube 71 becomes more conductive. In this manner the monostable multivibrator returns to the predetermined condition wherein tube 71 is conducting and tube 61 is cut off. Alternatively, if the input 80 to fieldistor 77 is placed at its low resistance region and the first fieldistor 67 is returned to its high resistivity position then tube 61 will be the tube which is normally conductive. However, if either fieldistor 67 or 77 is in its low-resistance state and the other fieldistor 77 or 67, as the case might be is in some resistance state determined by the input voltage to its respective input terminal then the duration of the pulse of the monostable multivibrator will be a predetermined interval of time. The time constant of capacitors 65 and 75 can be modified by fieldistors 67 and 77 respectively thereby changing the duration of monostability.

Figure 4:
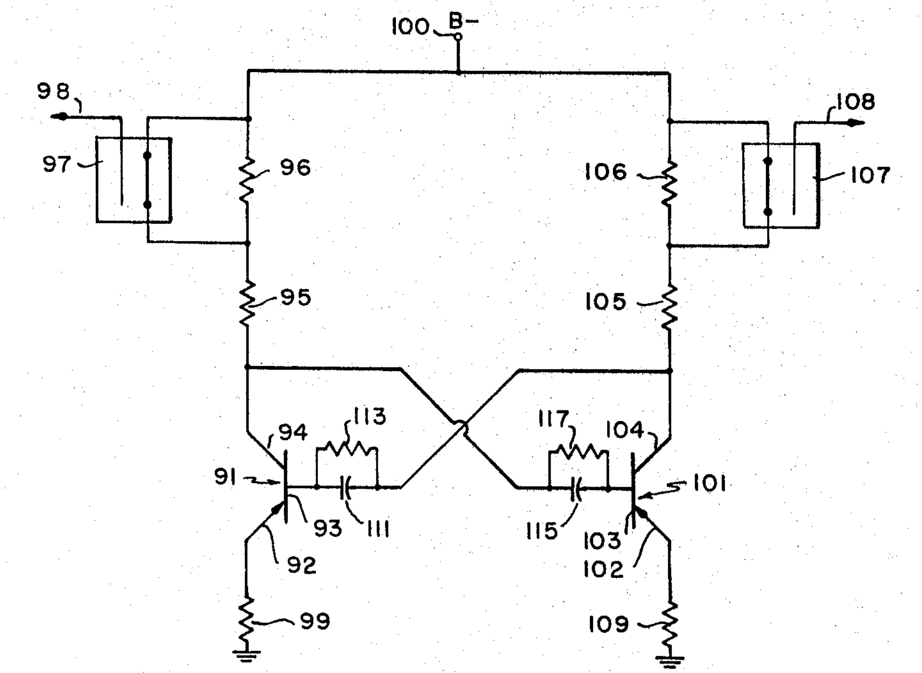
FIG. 4 is a circuit diagram of still another astable multivibrator forming an analog converter in accordance with the present invention.

FIG. 4 is a transistorized embodiment of the invention comprising a first transistor 91 having an emitter electrode 92, a base electrode 93 and a collector electrode 94 and a second transistor 101 having an emitter electrode 102, a base electrode 103 and a collector electrode 104. The collector electrode 104 is connected through a resistance 113 in parallel with capacitor 111 to the base of transistor 93. Collector electrode 94 of transistor 91 is connected through a resistor 17 in parallel with a capacitor 115 to the base 103 of transistor 101. The emitter electrode 92 is connected through resistor 99 to ground and the collector electrode 94 of transistor 91 is connected through resistor 95 and resistor 96 to the source of B minus potential 100. The fieldistor 97 is connected in parallel across resistor 96. Similarly, the emitter electrode 102 of transistor 101 is connected through resistor 109 to ground. The collector electrode 104 of transistor 101 is connected in series with resistor 105 and resistor 106 with source of B minus potential 100. A second fieldistor 107 is connected in parallel across resistor 106.

The circuit of FIG. 4 operates similar to the circuit of FIG. 1, with the only difference being that a resistor 113 is applied across the capacitor 111 and a second resistor 117 is applied across capacitor 115 for speeding up the slowest frequency that the circuit is capable of operating at and therefore the nature of the operation of both circuits are substantially identical. The only difference being is that the lowest frequency of FIG. 4 will be higher than that of FIG. 1 and the highest frequency of FIG. 4 still higher than that of FIG. 1.

Figure 5:
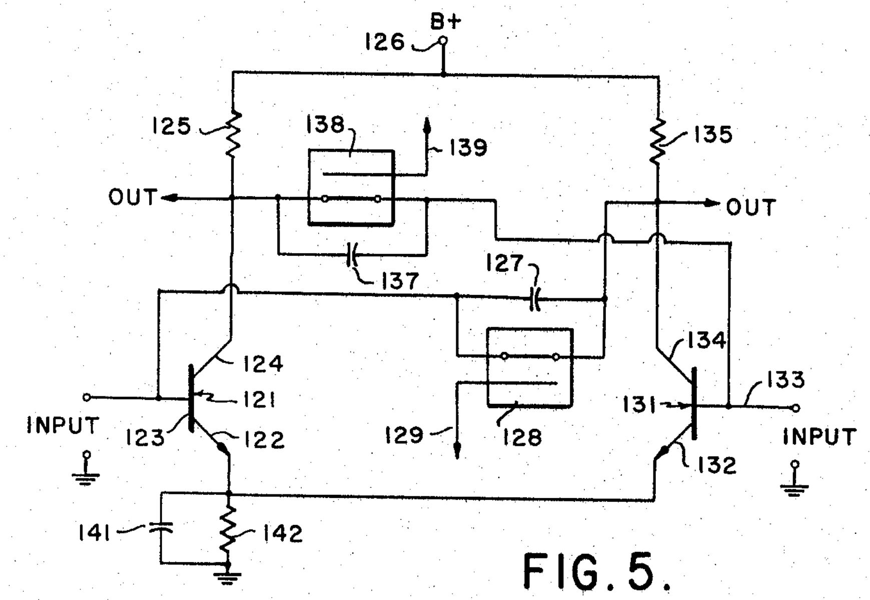
FIG. 5 is a circuit diagram of a bistable multivibrator convertible to a monostable multivibrator for variable time durations, having either side thereof in a predominately conductive condition embodying the instant invention.

FIG. 5 is a transistorized version of a monostable and bistable multivibrator. A first transistor 121 having an emitter electrode 122, a base electrode 123 and a collector electrode 124 and a second transistor 131 having an emitter electrode 132, as base electrode 133 and a collector electrode 134. The base electrode 124 of transistor 121 is coupled through a capacitor 127 to the collector electrode 134 of transistor 131 and a fieldistor 128 is placed in parallel with capacitor 127. The base electrode 133 of transistor 131 is coupled to the collector electrode 124 of transistor 121 through a capacitor 137 which has a fieldistor 138 connected in parallel therewith. The emitter electrode 122 of transistor 121 is connected to the emitter 132 of transistor 131 and the joint connection is connected through the parallel combination of a resistor 141 and a capacitor 141 to ground. The collector electrode 124 is further connected through resistor 125 to the source of B plus potential 126 and the collector electrode 134 of transistor 131 is connected through the resistor 135 to the source of B plus terminal 126. The operation of the transistorized version of FIG. 5 is similar to the operation of FIG. 3 therefore need not be described in any further detail.

Figure 6:
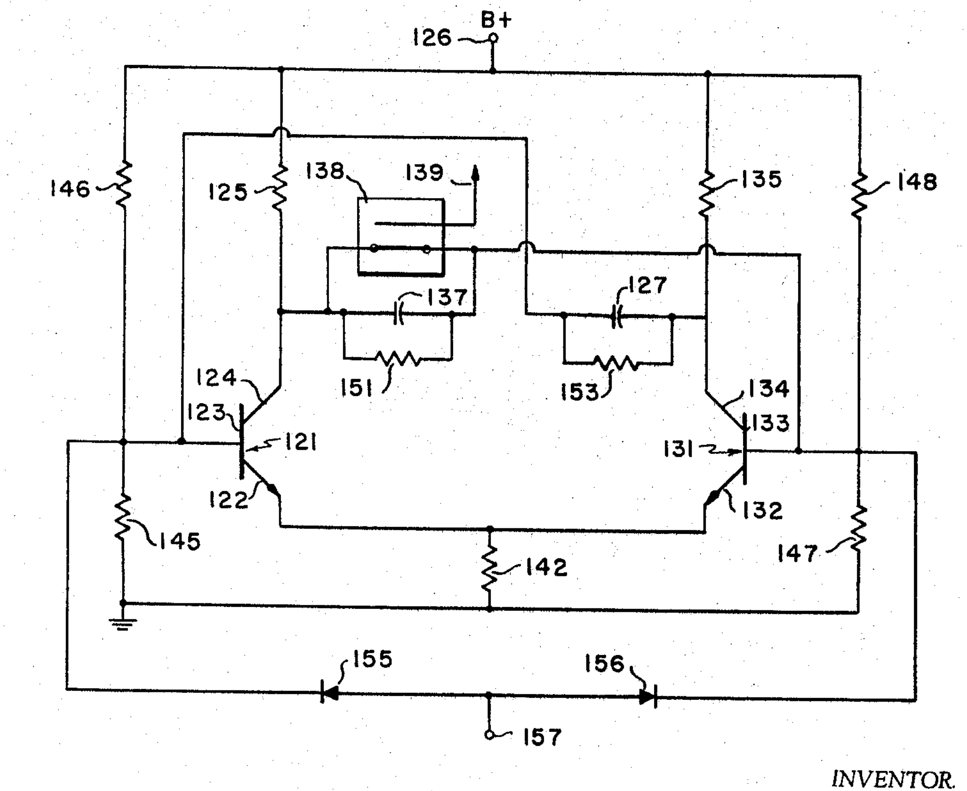
FIG. 6 is a circuit diagram of still another bistable or monostable multivibrator constructed in accordance with the invention.

FIG. 6 is still another embodiment of the present invention wherein common elements contain the same numbers as FIG. 5 and operate in a similar fashion. The only difference being a voltage divider 145 comprising a resistor 145 connected between ground and the base electrode 123 of transistor 121 and a second resistor 146 connected between the base electrode 123 of transistor 121 and a source of B plus voltage 126, a third voltage divider resistor 147 is connected between ground and the base electrode 133 of transistor 131 and a fourth resistor 148 is connected between the base electrode 133 and the source of B plus 126. A resistor 153 is placed in parallel with a resistor 127, a resistor 151 is placed in parallel with capacitor 137 and fieldistor 138. The ohmic value of resistor 151 and fieldistor 138 when the fieldistor 138 is in its highest resistive condition should be approximately equal to the resistance of resistor 153 for purposes of balancing the network. A first diode 155 has its cathode connected to the base electrode 123 of transistor 121 and its anode connected to the anode of diode 156. The cathode of diode 156 is coupled to the base electrode 133 of transistor 131 and a source of input pulses 157 is placed on a junction of the anodes of diodes 155 and 156. The circuit of FIG. 6 operates in a similar fashion as that of FIG. 5 however, with the difference as hereinafter to be explained. Pulses are applied to point 157 for changing the state of stability when the circuit is in its bistable operating condition when no analog voltage is placed on terminal 139. However, when it is desired to make only the one predetermined side of FIG. 6 monostable then an analog voltage sufficient to place the fieldistor 138 in its low resistivity condition is placed on input 139 of fieldistor 138 so that the circuit becomes permanently unbalanced.

In the event that there is interaction between the source of analog or control voltage and that of the voltages present in the multivibrator then suitable isolation circuits are provided in FIGS. 7, 8 and 9 to be hereinafter discussed in greater detail. The circuit of FIG. 7 can be utilized if necessary to supply an analog voltage for the fieldistor 33 of FIG. 1. To this end a first tube 201 having a cathode 202, a control grid 203 and a plate 204 is supplied with a first resistor 205 connected between the cathode 202 and ground and a second resistor 206 is connected between the plate 204 and the source of B plus voltage 207. A second tube 211 is provided having a cathode 212, a control grid 213 and a plate 214. The control grid 213 is directly connected to the anode 204 of tube 210 and the cathode 212 of tube 211 is connected through a resistor 215 to a source negative potential 217. The plate 214 of tube 211 is connected through resistor 216 to a source of positive potential 207 and the plate is further connected to the input terminal 34 of fieldistor 33. In operation the isolation network works as follows: a positive voltage supplied to the control grid 203 of tube 201 causes the tube 201 to become conductive thereby causing tube 213 which is normally conducting to become less conductive. Resistors 215 and 216 are so chosen as to place a negative potential on the input of fieldistor 34 when tube 211 is in its high conductive state. As conductivity of tube 211 becomes less and less its output which is connected to point 34 becomes more and more positive by reducing the flow of current through the tube 211. When the tube 211 becomes finally completely cut off then the potential on the input lead 34 will eventually approach the positive potential of point 207.

Figures 7, 8:
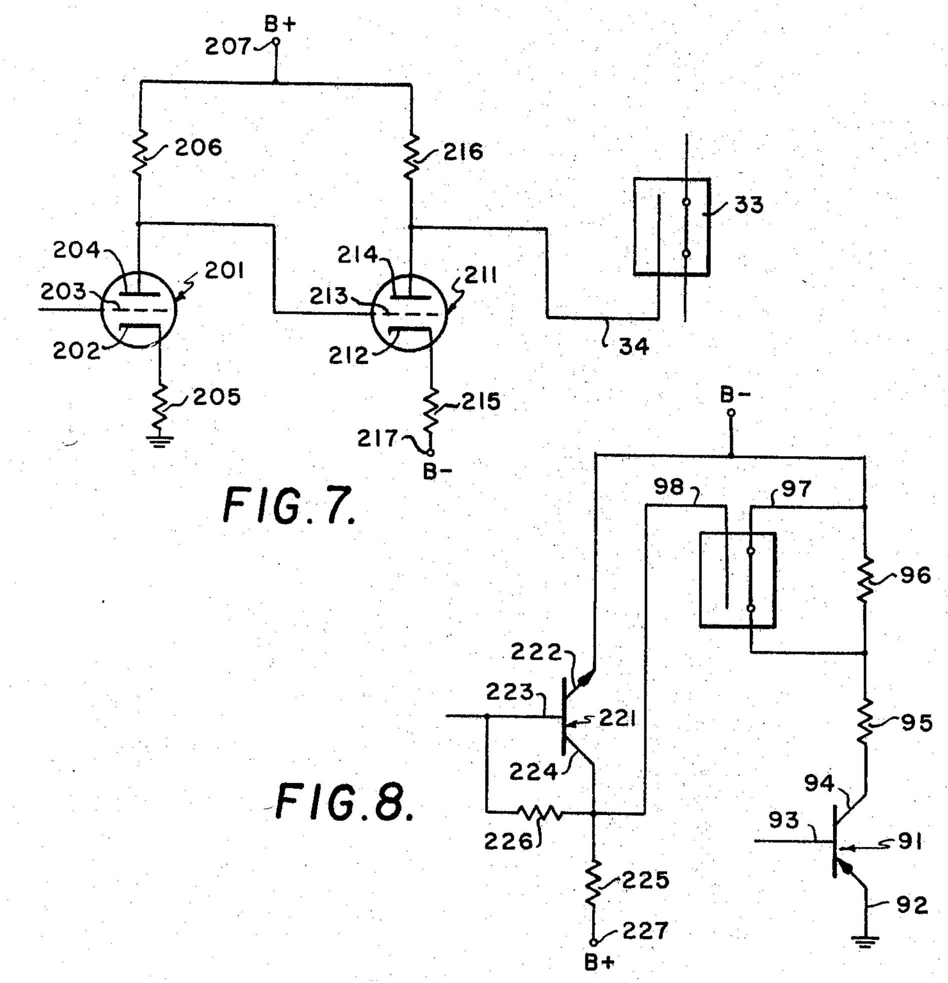
FIG. 7 is a circuit diagram of an isolation network utilizable with an embodiment of the invention shown in FIG. 1.
FIG. 8 is a circuit diagram of a suitable isolation network utilizable with an embodiment of the invention shown in FIG. 4.

FIG. 8 discloses an alternative embodiment of an isolation network utilizable in FIG. 4 of the instant invention. In this embodiment a first PNP type transistor 211 having an emitter electrode 222, a base electrode 223, and a collector electrode 224 is provided. The emitter electrode 222 is directly connected to the source of B minus potential. The collector electrode 224 is coupled through a resistor 225 to a source of B plus potential 227. A biasing resistor 226 is connected between the base electrode 223 and the collector electrode 224. The input electrode terminal 98 of fieldistor 97 is connected to the collector electrode 224 of transistor 221. In operation, the transistor 221 is normally conductive supplying a negative potential to the input terminal 98 of fieldistor 97, thereby holding fieldistor 97 in its high resistivity condition. However, upon applying a negative potential to the input electrode 223, transistor 221 becomes less and less conductive thereby gradually supplying a positive potential which is directly related to the negative input potential to the input terminal 98 of fieldistor 97, thereby causing the fieldistor to become more and more conductive and place a smaller resistance across element 96.

Figure 9:
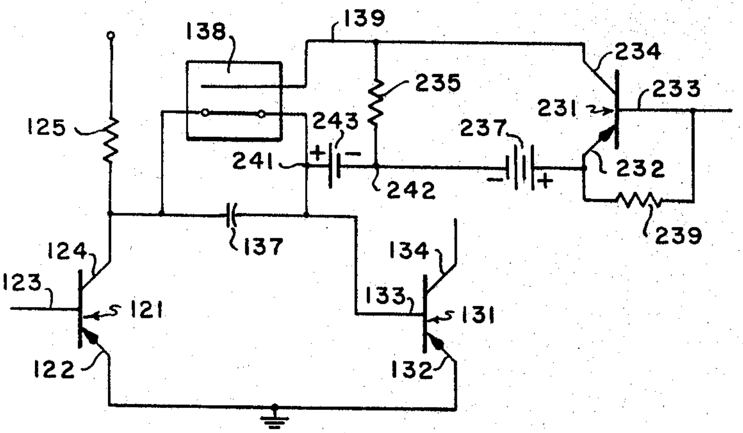
FIG. 9 is a circuit diagram of suitable isolation coupling utilizable with the embodiment of the invention illustrated in FIGS. 3, 5 and 6.

The isolation network shown in FIG. 9 is suitable for use in the circuits of FIG. 2, FIG. 5 and FIG. 6, by way of example, a first transistor 231 having an emitter electrode 232, a base electrode 233 and a collector electrode 234 is provided with a resistor 235 connected between the emitter electrode 232 and the base electrode 233. A source of potential 237 has its positive terminals connected to the emitter electrode 232 of transistor 231. The negative terminal of the battery is connected to the junction point 242 of the fieldistor circuit 138. A resistor 235 is connected between the negative terminal of battery 237 and the collector electrode 234 of transistor 231. The collector electrode 234 of transistor 231 is further connected to the input terminal 139 of fieldistor 138. A small cut off bias battery 243 is provided with terminals 241 and 242 to provide a negative potential on terminal 139 of fieldistor 138 in the absence of an input signal on the base 233 of transistor 231. However, if the resistance of the fieldistor is otherwise sufficient, the battery 243 may be eliminated. Upon applying a negative going signal on the base of transistor 231, the collector 234 of transistor 231 becomes more positive and its potential is directly related to the potential on its base, thereby placing a positive potential on terminal 139 of fieldistor 138. As the input signal on the base 233 becomes greater then the conductivity of fieldistor 138 increases. In this manner the analog input signal on the base electrode 233 is directly related to the resistivity of the fieldistor 138.

Figure 10:
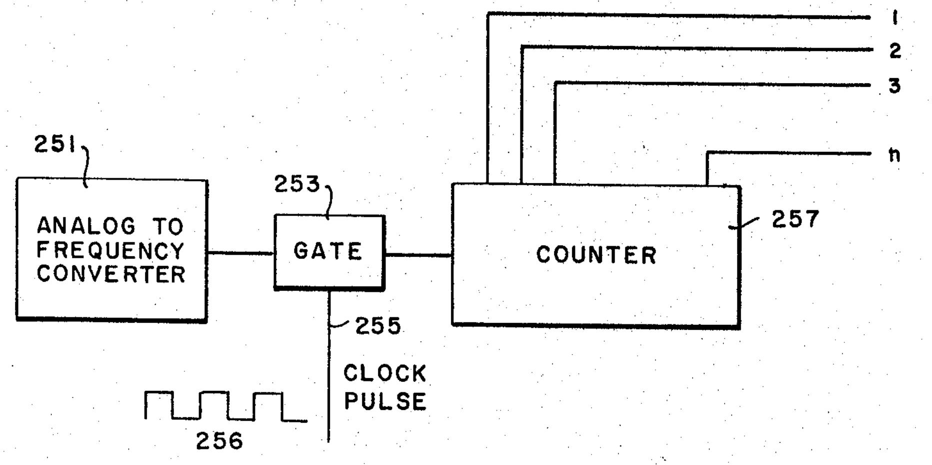
FIG. 10 is a block diagram of an analog to digital converter constructed in accordance with the invention.

FIG. 10 is an embodiment of the invention comprising an analog to digital converter. An anolog to frequency converter 251 may be the embodiment of FIG. 1, FIG. 2 or FIG. 4 of the present disclosure. The output of the analog to frequency converter 251 is connected to a first input terminal of a gate 253. A source of clock pulses being the clock pulses of a computer is supplied to the input terminal 255 of the gate. The output of the gate is supplied to a counter which has a plurality of outputs. The operation of FIG. 10 is as follows: the output pulses of the analog converter 251 is indicative of the analog input and the pulses are fed to the gate 253. The clock pulse 256 gates the gate on so that the pulse information of the analog to frequency converter is in synchronism with the digital computer in which the information is to be utilized. The pulses are counted in a counter 257 which is either a binary counter or a tens counter as desired. The output of the counter 257 is in digital form and appears on terminals 1, 2, 3, . . . N.

Figure 11:
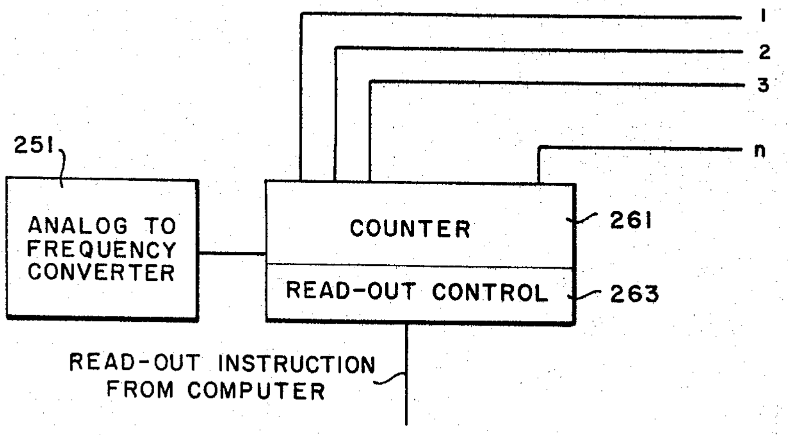
FIG. 11 is an alternative form of an analog to digital converter constructed in accordance with the invention.

The embodiment in FIG. 11 comprises a circuit wherein the output of the analog to frequency converter is not fast enough to be directly fed to the computer. In this instance the analog to frequency converter 251 is fed to a counter 261 having a read out control 263 supplied from the computer, the output pulses of the analog to frequency converter are stored in the counter 261 until such a time as instruction is received from the computer. Upon receipt of the instruction the counter supplies the output to its output terminals 1, 2, 3, . . . N.

Obviously many modifications and variations of the present invention are possible in the light of the above teachings. It is therefore to be understood that within the scope of the appended claims the invention may be practiced otherwise than as specifically described.

What is claimed is:

1. A system for converting an analog voltage bearing information in the form of amplitude into a coded group of pulses, the code of the latter corresponding to the amplitude of the former comprising:

a free running oscillator having a frequency determining means, said frequency determining means having a capacitor;

an impedance means for controlling the rate of charge of said capacitor connected in series circuit with said capacitor; and a fieldistor having a control electrode, said fieldistor having a pair of terminals, one of said fieldistor terminals being connected to the junction of said impedance means and said capacitor and the other fieldistor terminal being connected to the other end of said impedance means whereby an analog voltage placed on the control electrode of said fieldistor is converted to a series of encoded pulses.

2. A system for converting an analog voltage bearing information in the form of amplitude into a coded group of pulses, the code of the latter corresponding to the amplitude of the former comprising:

a free running oscillator having a frequency determining means, said frequency determining means having a capacitor;

a resistor, said resistor having one end connected to said capacitor; and a fieldistor having a control electrode, said fieldistor having a pair of terminals one of said fieldistor terminals being connected to the junctions of said resistor and said capacitor and the other fieldistor terminal being connected to the other end of said resistor whereby an analog voltage placed on the control electrode of said fieldistor is converted to a series of encoded pulses.

3. A system for converting an analog voltage bearing information in the form of amplitude into a coded group of pulses the code of the latter corresponding to the amplitude of the former;

said system comprising a first and second electronic valve having an input terminal and an output terminal; and first and second cross coupling capacitors;

said first capacitor coupled between the output of said first valve and the input of said second valve;

said second capacitor coupled between the output of said second valve and the input of said first valve;

a resistor connected to said first capacitor at the junction of said first capacitor and said output of said first valve;

a first means having an impedance which varies in response to a voltage placed on its control electrode responsive to the instantaneous amplitude of said analog voltage placed on said control electrode for controlling the time constant of said first capacitor;

said means being connected in parallel with said resistor.

4. A system for converting an analog voltage bearing information in the form of amplitude into a coded group of pulses, the code of the latter corresponding to the amplitude of the former as described in claim 3 but further characterized by having a second means having an impedance which varies in response to a voltage placed on its control electrode responsive to the instantaneous amplitude of said analog voltage placed on said control electrode for controlling the time constant of said second capacitor;

a second resistor connected to said second capacitor at the junction of said second capacitor and said output of said second valve;

said last named means being connected in parallel with said second resistor.

5. A system as described in claim 4 wherein said first and second means controls the rate of charge of said first and second capacitor respectively.

6. A voltage responsive system for controlling the operation of a multivibrator;

said system comprising a first and second electronic valve having an input and output;

first and second cross coupling capacitors;

said first capacitor coupled between the output of said first electronic valve and the input of said second electronic valve;

said second capacitor coupled between the output of said second electronic valve and the input of said first electronic valve; and a first fieldistor having a first and second terminal, said first and second fieldistor terminal being connected to respective ends of said first capacitor forming a parallel combination with said first capacitor.

7. A system as claimed in claim 6 but further characterized by said electronic valves being electron tubes.

8. A system as described in claim 6 but further characterized by said electronic valves being transistors.

9. A voltage responsive system for controlling the operation of a multivibrator comprising a first and second cross coupled electronic valve as described in claim 6 but further characterized by having means for selecting one of said electronic valves to be in the normally conducting state and by having a second means for controlling the duration of conduction of said other electronic valve.

10. A voltage responsive system for controlling the operation of a multivibrator as defined in claim 9 but further characterized by said electronic valve being transistors;

said first above named means being said first fieldistor; and said second named means being a second fieldistor.

11. A cross coupled multivibrator comprising a first and second electronic valve having an input and an output;

a first cross coupling network coupling the output of said first electronic valve to the input of said second electronic valve;

a second cross coupling network coupling the output of said second electronic valve to the input of said first electronic valve; and means having an impedance which varies in response to a voltage placed on its control electrode variably controlling the rate of current flow in one of said coupling networks responsive to the instantaneous amplitude of a voltage placed on said control electrode for converting said multivibrator from one form of operation to a second form of operation said last named means being connected in parallel with said first cross coupling network.

12. A system for converting an analog voltage bearing information in the form of amplitude into a coded group of pulses the code of the latter corresponding to the amplitude of the former;

a first and second tube, each tube having a cathode, a control grid and a plate;

said cathodes being coupled to ground;

first and second capacitive coupling networks;

said first capacitive coupling network connected between the plate of said first tube and the control grid of said second tube;

said second capacitive coupling network connected between the plate of said second tube and the control grid of said first tube;

a first terminal adapted to be connected to a source of B plus potential; and a first and second fieldistor each having a plurality of terminals, having one terminal of each fieldistor connected to said first terminal;

said first fieldistor having a second terminal connected to the plate of said first tube;

said second fieldistor having a second terminal connected to the plate of said second tube whereby voltages placed on a third terminal of said first and second fieldistor is converted to a coded group of pulses.

13. A system for converting an analog voltage bearing information in the form of amplitude into a coded group of pulses the code of the latter corresponding to the amplitude of the former;

a first and second tube each having a cathode, a control grid and a plate;

said cathodes being coupled to ground;

first and second capacitive coupling networks;

said first capacitive coupling network connected between the plate of said first tube and the control grid of said second tube;

said second capacitive coupling network connected between the plate of said second tube and the control grid of said first tube;

a point of ground potential; and a first fieldistor having a plurality of terminals and a control electrode one of which is connected to ground and a second terminal is connected to the control grid of said first tube whereby an analog voltage placed on said control electrode of said fieldistor is connected to a coded group of pulses.

14. A system as described in claim 13 but further characterized by having a second fieldistor connected between ground and the control grid of said second tube.

15. A system for converting an analog voltage bearing information in the form of amplitude into a coded group of pulses, the code of the latter corresponding to the amplitude of the former;

a first and second tube having a cathode, a control grid and a plate;

said cathodes being coupled to ground;

first and second capacitive coupling networks;

said first capacitive coupling network connected between the plate of said first tube and the control grid of said second tube;

said second capacitive coupling network connected between the plate of said second tube and the control grid of said first tube;

a first fieldistor connected in parallel with said first capacitive coupling network; and a second fieldistor connected in parallel with said second capacitive network.

16. A system for converting an analog voltage bearing information in the form of amplitude into a coded group of pulses the code of the latter corresponding to the amplitude of the former;

a first and second tube each having a cathode, a control grid and a plate;

a first capacitive network coupled between the grid of said first tube and the plate of said second tube;

a second capacitive network coupled between the grid of said second tube and the plate of said first tube;

the cathodes of said first tube and the cathode of said second tube being coupled to ground;

a first resistance coupled between the grid of said first tube and ground;

a second resistance coupled between the grid of said tube and ground;

a source of B plus potential;

a third resistance connected between the plate of said first tube and said source of B plus potential;

a fourth resistance connected between the plate of said second tube and said source of B plus potential;

a first fieldistor having an input electrode and a pair of output electrodes connected in parallel with said third resistance; and a second fieldistor having an input electrode and a pair of output electrodes connected in parallel with said fourth resistance whereby the analog voltage signals to be encoded are placed on the input electrodes of said fieldistors.

17. A system for converting analog voltages as defined in claim 16, but further characterized by having first and second isolation networks;

said first isolation network being connected to the input terminal of said first fieldistor and said isolation network is connected to the input terminal of said second fieldistor.

18. A system for converting analog voltages as defined in claim 16, but further characterized by having a gate having an input and an output;

a counter having a plurality of outputs and an input, the input of said counter being coupled to said gate;

the input of said gate being connected to the plate of said first tube whereby the output of the counter is in a digital code.

19. A system for converting an analog voltage bearing information in the form of amplitude into a coded group of pulses the code of the latter corresponding to the amplitude of the former;

a first and second tube each having a cathode, a control grid and a plate;

a first capacitive network coupled between the grid of said first tube and the plate of said second tube;

a second capacitive network coupled between the grid of said second tube and the plate of said first tube;

the cathodes of said first tube and the cathode of said second tube being coupled to ground;

a first resistance coupled between the grid of said first tube and ground;

a second resistance coupled between the grid of said second tube and ground;

a source of B plus potential;

a third resistance connected between the plate of said first tube and said source of B plus potential;

a fourth resistance connected between the plate of said second tube and said source of B plus potential;

a first fieldistor having an input electrode and a pair of output electrodes connected in parallel with said first resistance; and a second fieldistor having an input electrode and a pair of output electrodes connected in parallel with said fourth resistance whereby the analog voltage signals to be encoded are placed on the input electrodes of said fieldistors.

20. A system for converting analog voltages as defined in claim 19, but further characterized by having a first and second isolation networks;

said first isolation network being connected to the input terminal of said first fieldistor and said second isolation network is connected to the input terminal of said second fieldistor.

21. A system for converting analog voltages as defined in claim 19, but further characterized by having a gate having an input and an output;

a counter having a plurality of outputs and an input, the input of said counter being coupled to said gate;

the input of said gate being connected to the plate of said first tube whereby the output of the counter is in a digital code.

22. A system for converting an analog voltage bearing information in the form of amplitude into a coded group of pulses the code of the latter corresponding to the amplitude of the former;

a first and second tube each having a cathode, a control grid and a plate;

a first capacitive network coupled between the grid of said first tube and the plate of said second tube;

a second capacitive network coupled between the grid of said second tube and the plate of said first tube;

the cathode of said first tube and the cathode of said second tube being coupled to ground;

a first resistance coupled between the grid of said first tube and ground;

a second resistance coupled between the grid of said second tube and ground;

a source of B plus potential;

a third resistance connected between the plate of said first tube and said source of B plus potential;

a fourth resistance connected between the plate of said second tube and said source of B plus potential;

a first fieldistor having an input terminal and a first and second terminal connected in parallel with said first capacitive network; and a second fieldistor having an input terminal and a first and second terminal connected in parallel with said second capacitive network whereby the analog voltage signals to be encoded are placed on the input electrodes of said fieldistors.

23. A system for converting analog voltages as defined in claim 22, but further characterized by having a first and second isolation networks;

said first isolation network being connected to the input terminal of said first fieldistor and said second isolation network is connected to the input terminal of said second fieldistor.

24. A system for converting analog voltages as defined in claim 22, but further characterized by having a gate having an input and an output;

a counter having a plurality of outputs and an input, the input of said counter being coupled to said gate;

the input of said gate being connected to the plate of said first tube whereby the output of the counter is in a digital code.

25. A system for converting a multivibrator from a first state of operation to a second state of operation comprising:

a first and second electronic valve, each having an input and output;

first and second cross coupling networks;

said first network coupled between the output of said first electronic valve and the input of said second electronic valve;

said second network coupled between the output of said electronic valve and the input of said first electronic valve; and a first fieldistor having a control electrode, said first fieldistor connected in parallel with said first cross coupling network and a second fieldistor having a control electrode, said second fieldistor connected in parallel with said second cross coupling network whereby control voltages placed on said control electrodes of said first and second fieldistors respectively change the operation of said multivibrator from a first state to a second state.

26. A system for converting a multivibrator from a first state of operation to a second state of operation comprising:

a first and second electronic valve, each having an input and output;

first and second cross coupling capacitor;

said first capacitor coupled between the output of said first electronic valve and the input of said second electronic valve;

a first resistor connected to said first capacitor and a second resistor connected to said second capacitor;

said second capacitor coupled between the output of said second electronic valve and the input of said first electronic valve; and means for selecting one of said electronic valves to be in the normally conducting state connected in parallel with said first resistor and by having a second means for controlling the duration of conduction of said other electronic valve connected in parallel with said second resistor.

27. A cross coupled multivibrator as defined in claim 26 but further characterized by:

said first above named means being a fieldistor having a control electrode for receiving a control signal;

said second named means being a fieldistor having a control electrode for receiving a control signal whereby the duration of conduction of said other electronic valve is determined by said control signal on said control electrode on said second fieldistor.

28. A system for converting a multivibrator from a first state of operation to a second state of operation comprising:

a first and second electronic valve, each having an input and output;

first and second cross coupling capacitor;

said first capacitor coupled between the output of said first electronic valve and the input of said second electronic valve;

said second capacitor coupled between the output of said second electronic valve and the input of said first electronic valve; and means responsive to control signals for causing said multivibrator to operate in an astable operating condition at a first state of said control signals, to operate in a monostable condition at a second state of said control signals and to operate in a bistable condition at a third state of said control signals said last named means being connected to said first capacitor and to said second capacitor.

29. A system for converting a multivibrator from a first state of operation to a second state of operation as defined in claim 28 but further characterized by said means responsive to control signals being a first fieldistor being connected in parallel with said first cross coupling capacitor and a second fieldistor being connected in parallel with said second cross coupling capacitor.

30. A system for converting a multivibrator from a first state of operation to a second state of operation as defined in claim 28 but further characterized by having a first resistor connected to said first cross coupling capacitor and a second resistor connected to said second cross coupling capacitor, said means being responsive to control signals being a first fieldistor being connected in parallel with said first resistor and a second fieldistor being connected in parallel with said second resistor.

References Cited

UNITED STATES PATENTS

| | | | |
|---|---|---|---|
| 2,666,852 | 1/1954 | Hollingsworth | 250—36 |
| 2,878,385 | 3/1959 | Koustas | 250—36 |
| 3,129,391 | 4/1964 | Kabell | 332—16 |
| 3,167,726 | 1/1965 | Foerster | 332—16 |
| 3,204,200 | 8/1965 | White | 332—14 |
| 3,253,153 | 5/1966 | Stoddard | 250—237 |

FOREIGN PATENTS

| | | |
|---|---|---|
| 600,004 | 3/1948 | Great Britain. |

DARYL W. COOK, *Acting Primary Examiner.*

MAYNARD R. WILBUR, *Examiner.*

A. L. NEWMAN, *Assistant Examiner.*

UNITED STATES PATENT OFFICE

CERTIFICATE OF CORRECTION

Patent No. 3,327,301 June 20, 1967

Marvin Reich

It is hereby certified that error appears in the above numbered patent requiring correction and that the said Letters Patent should read as corrected below.

In the heading to the printed specification, line 6, for "1174 College View Drive," read -- 11741 College View Drive, --.

Signed and sealed this 14th day of November 1967.

(SEAL)
Attest:

Edward M. Fletcher, Jr.
Attesting Officer

EDWARD J. BRENNER
Commissioner of Patents